United States Patent [19]

Underwood

[11] 3,845,668
[45] Nov. 5, 1974

[54] CLUTCH AND GEAR TRAIN UTILIZING SAME
[75] Inventor: David W. Underwood, Clayton, Ind.
[73] Assignee: P. R. Mallory & Co., Inc., Indianapolis, Ind.
[22] Filed: Feb. 20, 1973
[21] Appl. No.: 333,620

[52] U.S. Cl. ............... 74/412, 74/577 S, 192/46
[51] Int. Cl. ...... F16h 1/02, F16d 11/00, G05g 1/00
[58] Field of Search ................ 192/45.1, 54, 46 X; 74/412 R, 421 R, 577 S

[56] References Cited
UNITED STATES PATENTS
2,366,912  1/1945  Lauper .......................... 192/46 X
3,340,972  9/1967  Burkland et al. ................ 192/46 X
3,720,294  3/1973  Plamper ........................ 192/46

Primary Examiner—Leonard H. Gerin
Attorney, Agent, or Firm—Charles W. Hoffman; Robert F. Meyer

[57]    ABSTRACT
A series of plastic gears is coupled to a series of metal gears through a combination plastic gear and a metal gear carried on a common shaft. A gear train is carried in a housing on a support plate carried by the bottom of the housing. The clutch includes a first rotating member carrying a spring biased pivotly mounted pawl and a stop means engaging the pawl, the pawl also engaging a second rotating member carried about the first rotating member.

16 Claims, 6 Drawing Figures

CLUTCH AND GEAR TRAIN UTILIZING SAME

Generally speaking, the present invention relates to a gear train having a series of plastic gears and a series of metal gears, and a plastic gear and a metal gear carried on a common shaft the plastic gear being connected to the series of plastic gears and the metal gear being connected to the series of metal gears. The gear train is carried on a support plate which is carried in a bottom portion of a housing for the gear train. As adapted to a gear train the clutch of the present invention comprises a shaft, a pinion rotatably carried by the shaft and engaging a gear of the gear train, a spring biased pawl pivotly carried by the pinion, and stop means carried by the pinion and adapted to engage the pawl if the pinion rotates in a predetermined direction, and a gear independently rotatably carried about the pinion and having internal teeth adapted to engage the pawl, the gear engaging another gear on the gear train.

Small synchronous motors are being increasingly used in applications such as clocks and as a means to drive timing mechanisms which in turn sequentially operate appliances such as dishwashers. In order to adapt the output speed to the required speed of the device being driven, a synchronous motor is usually coupled to the device through a speed reducing means such as a gear train. For the most part such gear trains have been constructed of metal in order to withstand the torque at various stages of the gear train. It has been found, however, that the torque required at the "upstream" stages of the gear train is less than that required at the "downstream" stages. For this reason it would be far more economical both in terms of material and fabrication costs to construct the gear stages of a relatively low torque of a cheaper material such as a suitable plastic, with those stages of a relatively high torque being constructed of a metal.

Another problem associated with gear trains is that of providing a clutch means which would permit a manual setting of a load such as a timer independent of the motor. Such a clutch should be made as simple as possible and yet provide a positive drive when needed.

It is a feature of the present invention to provide a gear train which is relatively low in material and fabrication costs. Another feature of the invention is the provision of a gear train which utilizes a cheaper material in those stages having a relatively lower torque in conjunction with a more expensive material for those stages having a relatively higher torque. Still another feature of the invention is the provision of a gear train having a series of plastic gears and a series of metal gears. Yet another feature of the invention is the provision of a gear train having a series of plastic gears and a series of metal gears and a plastic gear and a metal gear combination carried on a common shaft, the plastic gear being connected to one of a series of plastic gears and the metal gear being connected to one of the series of metal gears.

Another feature of the invention is the provision of a clutch which is readily adaptable tp a gear train and which is simple in construction. Another feature of the invention is the provision of a clutch which utilizes a gear of a gear train as one of its structural elements. Still another feature of the invention is the provision of a clutch having a shaft, a pinion carried by the shaft, a gear carried independently about the pinion, and spring means connected to the pinion and frictionally engaging the gear. Yet another feature of the invention is the provision of another embodiment of a clutch, the clutch having a shaft, a pinion rotatably carried by the shaft, a spring biased pawl pivotly carried by the pinion, stop means carried by the pinion and adapted to engage the pawl, and a gear independently rotatably carried about the pinion and having internal teeth adapted to engage the pawl.

As an additional feature of the invention a support plate is carried on the bottom of a housing for the gear train, the support plate carrying the gear train.

These and other features of the invention will become apparant from the following description being in conjunction with the accompanying drawings wherein.

Figure 1:
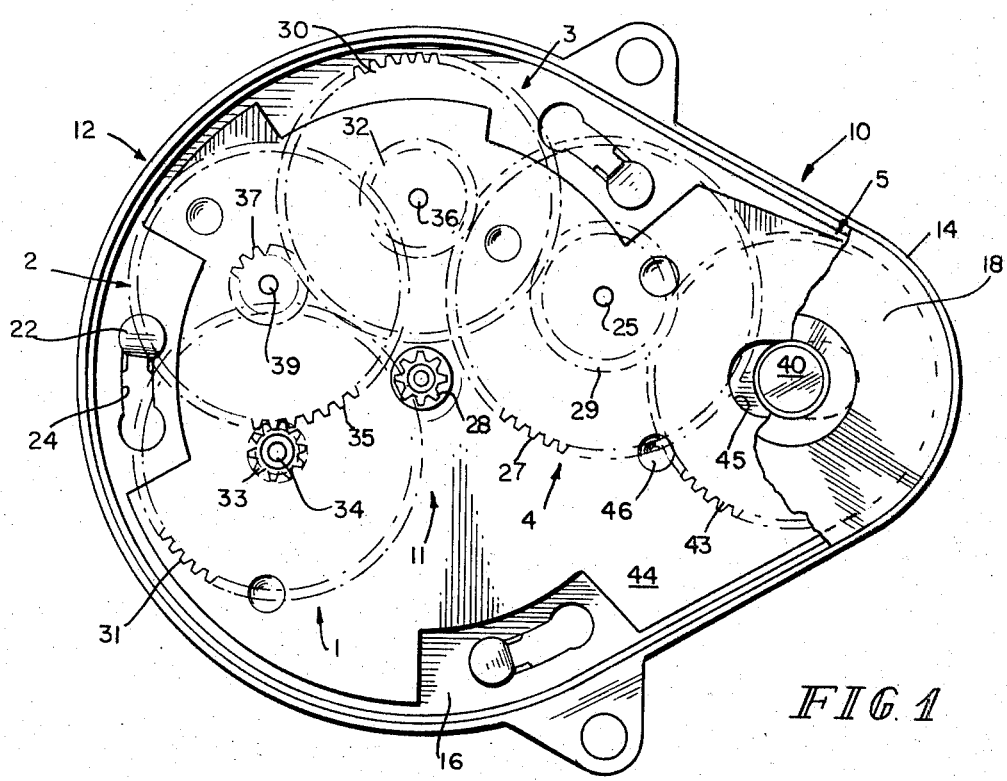
FIG. 1 is a plan view of a gear train with the cover of its housing being removed.

Referring now to the drawings there is shown a gear train 10 substantially enclosed in a housing 12. Housing 12 includes a cup shaped member 14 having a bottom portion 16 and an open end 17 which is closed by cover 18. The housing is connected to a synchronous motor 20 through a plurality of tabs 22 which are locked into apperture 24 provided in the bottom portion 16 of the cup shaped member. Synchronous motor 20 may be of any type well known in the art; for example, a typical synchronous motor is described in U.S. Pat. No. 3,558,940 issued Jan. 26, 1971. Alternating current power is supplied to motor 20 through leads 26. Synchronous motor 20 would include an output pinion 28 to which the gear train is coupled.

As shown, gear train 10 includes an input gear or pinion 28, an output 40, and coupling means 11 connecting the input to the output. In the illustrative embodiment, coupling means 11 includes a plurality of stages of gears (1–5). It should be understood that any number of stages may be used depending upon the gear reduction desired. Stages 1–4 are comprised of gear and pinion combinations. Stage 1 includes gear 31 and pinion 33 carried on shaft 34, stage 2 includes gear 35 and pinion 37 carried on shaft 39; stage 3 includes gear 30 and pinion 32 carried on shaft 36; stage 4 includes gear 27 and pinion 29 carried on shaft 25; and stage 5 includes gear 43 carried on shaft 42. Output 40, shaft 42, and gear 43 are unitarily constructed and are journalled in bushing 48 and 50 which are carried by cover 18 and bottom portion 16 of cup shaped member 14. Substantial support for the gear train is provided, however, through support plate 44 which includes an aperture 45 through which bushing 50 extends. The gear train is carried by the support plate, the support plate being carried by bottom portion 16 through a plurality of lugs 46. The "point" contact provided by the lugs with the bottom portion provides a means of providing stability for the support plate.

Figure 3:
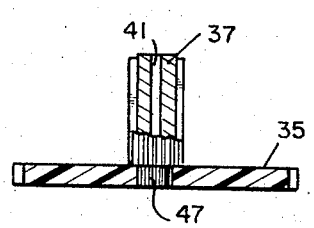
FIG. 3 is a section of one of the gears of the gear train of FIG. 2.

According to a feature of the present invention, gear train 10 is composed of a series of plastic gears and a series of metal gears, the plastic gears being used to transmit relatively low torque and the metal gears a relatively high torque. In the illustrated embodiment shown in the drawings the series of plastic gears includes gear 31 and pinion 33, that is, the first stage of the gear train; while the series of metal gears includes the gear and pinion combination of stages 3–5. In order to couple stage 1 to stage 3 there is provided a gear and pinion combination 35 and 37 for stage 2 which as more clearly shown in FIG. 3 is comprised of a plastic gear 35 and a metal pinion 37 carried on a shaft 39 (FIG. 1) through bore 41 which extends through pinion 37 and gear 35. Gear 35 is carried on a splined member 47. Metal pinion 37 engages metal gear 30 of stage 3 while plastic gear 35 engages plastic pinion 33 of stage 1. While this feature of the invention has been described as having a plastic-metal gear combination being located at stage 2 it should be understood that such combination may be located at any stage in the gear train depending upon torque requirements.

Figure 4:
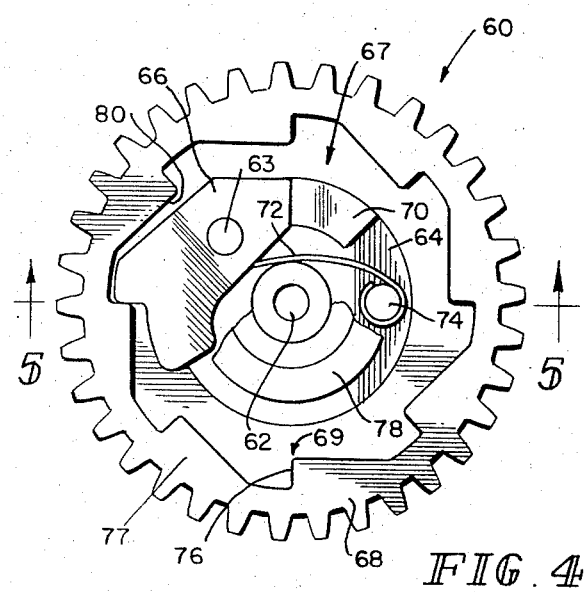
FIG. 4 is a plan view of a clutch used in the gear train.
Figure 5:
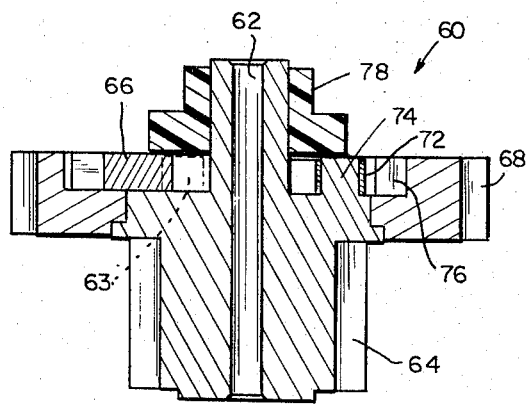
FIG. 5 is a section taken along the lines 5—5 of FIG. 4.

FIGS. 4 and 5 illustrate an embodiment of a clutch which may be used in conjunction with the gear train 10 as part of the coupling means 11. As shown in the embodiment of FIGS. 4 and 5 clutch 60 includes a pinion 64 rotatably carried on a shaft which may be journalled in bore 62, a spring biased pawl 66 carried by the pinion, stop means 67 carried by the pinion, and gear 68 rotatably carried about the pinion. Stop means 67 includes a post 70 carried by pinion 64. Pawl 66 is pivotly mounted on post 63 and is spring biased through leaf spring 72 which is carried on post 74. Engaging means 69 includes internal teeth 76 carried on hub 77 which engage pawl 66. The assembly of gear 68, pawl 66, and leaf spring 72 is retained on pinion 64 through lug 78.

In operation, clutch 60 may be substituted in any one of the stages of the gear train 10. When gear 68 is being driven in a desired direction (clockwise as viewed in FIG. 4) teeth 76 will engage pawl 66 tending to pivot the pawl about post 63. The pawl, however, will engage post 70 thus preventing the pawl from pivoting such that pinion 64 will be driven in a clockwise direction. Should it be desired to manually rotate gear 68 in the opposite direction (counterclockwise) ramps 80 of teeth 76 will pivot pawl 66 out of the path of the directional rotation of the ramp to permit the gear to be manually rotated.

Figure 2:
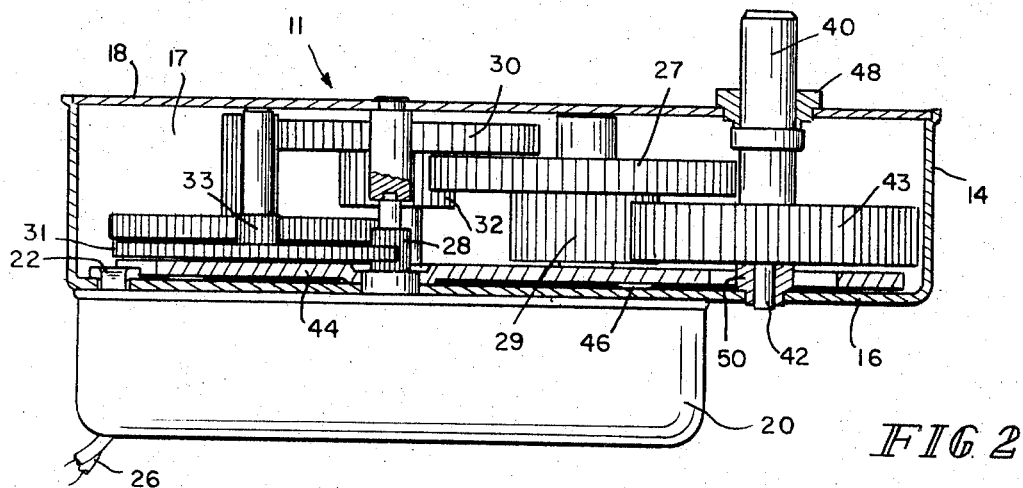
FIG. 2 is a transverse section of the gear train.
Figure 6:
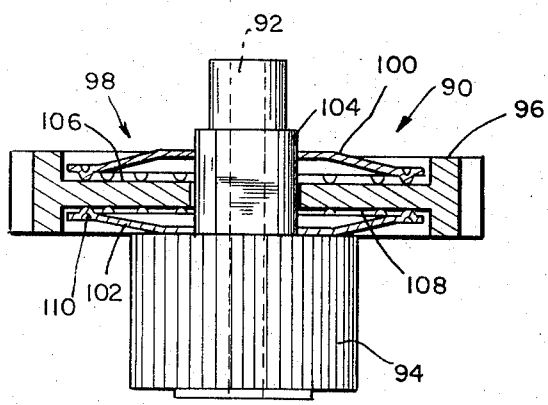
FIG. 6 is a transverse section of another embodiment of a clutch for the gear train.

FIG. 6 illustrates another embodiment of a clutch which may be used in the gear train. As in the case of the embodiment of FIGS. 4 and 5 the clutch illustrated in FIG. 6 may be substituted for any one of the stages of gear train 10 illustrated in FIGS. 1 and 2. Clutch 90 includes a pinion 94 carried on a hub 104, a gear 96 rotatably carried on hub 94, and spring means fixedly connected to hub 94 and frictionally engaging gear 106. The clutch may be rotatably carried on a shaft of gear train 10 through bore 92. In the embodiment illustrated, spring means 98 includes a pair of spring washers 100 and 102 respectively carried on hub 104 of pinion 94 and frictionally engaging opposed faces 106 and 108 of gear 96. Spring washers 100 and 102 frictionally engage the opposite faces through a multiplicity of dimples 110.

In the operation of the embodiment of FIG. 6, clutch 90 will transmit rotational motion in either direction up to a predetermined torque level. Once this level is exceeded spring washers 100 and 102 will slip on the faces of gear 96 such that gear 96 will no longer rotate.

What is claimed is:

1. A gear train comprising:
   a. an input gear,
   b. an output, and
   c. coupling means coupling said input to said output comprising a series of gears including a series of plastic gears and a series of metal gears, and a plastic gear and a metal gear carried on a common shaft, said plastic gear engaging a gear of said series of plastic gears and said metal gear engaging a metal gear of said series of metal gears.

2. A gear train according to claim 1 wherein said series of gears comprise at least two gear and pinion combinations each combination carried on a common shaft.

3. A gear train according to claim 1 wherein said metal gear is a pinion.

4. A gear train according to claim 1 wherein said coupling means further includes a clutch.

5. A gear train according to claim 4 wherein said clutch comprises:
   a. a shaft
   b. a pinion rotatably carried by said shaft and engaging a gear of said series of gears,
   c. a spring biased pawl pivotally carried by said pinion, and stop means carried by said pinion and adapted to engage said pawl when said pinion rotates in a predetermined direction, and
   d. a gear independently rotatably carried about said pinion and having internal teeth adapted to engage said pawl, said gear engaging another gear of said series of gears.

6. A gear train according to claim 5 wherein said stop means comprises a post carried by said pinion.

7. A gear train according to claim 5 wherein a leaf spring carried on said pinion biases said pawl.

8. A gear train according to claim 4 wherein said clutch comprises:
   a. a shaft
   b. a pinion carried by said shaft and engaging a gear of said series of gears
   c. a gear independently carried about said pinion and engaging a gear of said gear train and
   d. spring means connected to said pinion and frictionally engaging said gear.

9. A gear train according to claim 8 wherein said spring means comprises a pair of spring washers frictionally engaging opposed faces of said gear.

10. A speed reducing means comprising:
    a. a housing including a base portion,
    b. a support plate carried by said base portion through a plurality of lugs carried by said support plate and engaging said base portion, and
    c. a gear train disposed wherein said housing and including an input gear and an output gear, said gear train carried by said support plate.

11. A speed reducing means according to claim 10 wherein said housing comprises a cup shaped member and a cover closing same.

12. A speed reducing means according to claim 11 wherein said base portion comprises the closed end of said cup shaped member.

13. A clutch comprising:
    a. a first rotating member carried on a shaft,
    b. a second rotating member carried about said first rotating member, c. a spring biased, pivotly mounted pawl carried by said first rotating member,
d. stop means carried by said first rotating member, and
e. internal teeth provided in a hub of said second rotating member selectively engaging said pawl.

14. A clutch according to claim 13 wherein a leaf spring carried by said first rotating member spring biases said pawl.

15. A clutch according to claim 13 wherein said stop means includes a post carried by said first rotating member.

16. A clutch according to claim 13 wherein said first rotating means comprises a pinion, and said second rotating member comprises a gear, said gear having internal teeth engaging said pawl.

* * * * *